United States Patent
Young et al.

(10) Patent No.: US 10,892,832 B2
(45) Date of Patent: Jan. 12, 2021

(54) MOVING PLATFORM ROLL ANGLE DETERMINATION SYSTEM USING RF COMMUNICATIONS LINK

(71) Applicant: TELEDYNE SCIENTIFIC & IMAGING, LLC, Thousand Oaks, CA (US)

(72) Inventors: Adam Young, Thousand Oaks, CA (US); Bruce K. Winker, Ventura, CA (US)

(73) Assignee: Teledyne Scientific & Imaging, LLC, Thousand Oaks, CA (US)

(*) Notice: Subject to any disclaimer, the term of this patent is extended or adjusted under 35 U.S.C. 154(b) by 724 days.

(21) Appl. No.: 14/538,623

(22) Filed: Nov. 11, 2014

(65) Prior Publication Data

US 2016/0134378 A1    May 12, 2016

(51) Int. Cl.
H04B 14/00 (2006.01)
G01S 5/02 (2010.01)

(52) U.S. Cl.
CPC .......... H04B 14/008 (2013.01); G01S 5/0247 (2013.01)

(58) Field of Classification Search
CPC ............................ H04B 14/008; G01S 5/0247
USPC ......................................................... 342/361
See application file for complete search history.

(56) References Cited

U.S. PATENT DOCUMENTS

| | | | |
|---|---|---|---|
| 3,594,085 A | 7/1971 | Wilmanns | 356/114 |
| 4,097,007 A | 6/1978 | Fagan et al. | 244/3.11 |
| 4,256,368 A | 3/1981 | Task | 350/408 |
| 4,318,591 A | 3/1982 | Elterman | 350/374 |
| 4,520,362 A | 5/1985 | Charlot | 343/361 |
| 4,737,793 A * | 4/1988 | Munson | H01Q 21/245 342/361 |
| 5,007,692 A | 4/1991 | Matsuura | 350/6.8 |
| 5,038,150 A * | 8/1991 | Bains | H01Q 25/001 342/188 |
| 5,039,029 A * | 8/1991 | Taylor | G01S 11/02 244/3.11 |
| 5,042,951 A | 8/1991 | Gold et al. | 356/369 |
| 5,099,246 A * | 3/1992 | Skagerlund | F41G 7/305 244/3.14 |
| 5,200,606 A | 4/1993 | Krasutsky et al. | 250/216 |
| 5,218,582 A | 6/1993 | Marchant | 369/14 |
| 5,272,351 A | 12/1993 | Andressen | 250/561 |
| 5,344,099 A * | 9/1994 | Pittman | F41G 7/28 244/3.13 |
| 5,414,430 A * | 5/1995 | Hansen | F41G 7/305 244/3.11 |
| 5,574,479 A | 11/1996 | Odell | 345/158 |

(Continued)

OTHER PUBLICATIONS

Wikipedia article, "Heterodyne", Oct. 26, 2014 version.*

*Primary Examiner* — Frank J McGue (74) *Attorney, Agent, or Firm* — M.J. Ram and Associates (57) ABSTRACT

An orientation tracking system for a moving platform includes a transmitter which generates an beam having a known polarization with respect to a predefined coordinate system. The moving platform includes an ellipsometric detector capable of detecting the polarized beam when within the line-of-sight of the transmitter, and measuring its polarization state. The polarization state indicates the rotational orientation of the moving platform with respect to the predefined coordinate system. The beam could also be used to convey guidance commands to the platform.

34 Claims, 3 Drawing Sheets

(56) References Cited

U.S. PATENT DOCUMENTS

| | | | |
|---|---|---|---|
| 5,708,583 A | 1/1998 | Solenne et al. | 364/424.013 |
| 5,757,671 A | 5/1998 | Drevillon et al. | 364/525 |
| 7,023,380 B2* | 4/2006 | Schneider | G01S 5/0247 |
| | | | 244/3.11 |
| 7,345,625 B1* | 3/2008 | Urkowitz | G01S 7/026 |
| | | | 342/159 |
| 7,589,663 B1* | 9/2009 | Goldman | F41G 7/305 |
| | | | 244/3.1 |
| 7,969,357 B2* | 6/2011 | Russo | H04B 7/10 |
| | | | 342/361 |
| 7,977,613 B2 | 7/2011 | Rastegar et al. | 244/3.1 |
| 8,009,292 B2 | 8/2011 | Choi et al. | 356/369 |
| 8,106,811 B2* | 1/2012 | Vander Velde | F41G 7/222 |
| | | | 342/16 |
| 8,169,612 B2 | 5/2012 | Gao | 356/369 |
| 8,258,999 B2 | 9/2012 | Rastegar et al. | 342/62 |
| 8,269,667 B2 | 9/2012 | Vander Velde et al. | |
| | | | 342/357.36 |
| 8,749,430 B2* | 6/2014 | Shinonaga | H01Q 3/36 |
| | | | 342/157 |
| 9,625,565 B2* | 4/2017 | Eidloth | G01S 5/0294 |
| 2004/0200947 A1 | 10/2004 | Lau | 250/202 |
| 2006/0192961 A1 | 8/2006 | Smith et al. | 356/364 |
| 2008/0316463 A1 | 12/2008 | Okada et al. | 356/4.01 |
| 2010/0052981 A1 | 3/2010 | Alexander et al. | 342/357.06 |
| 2010/0328644 A1 | 12/2010 | Lu et al. | 356/5.01 |
| 2013/0169477 A1 | 7/2013 | Luo et al. | 342/357.37 |

\* cited by examiner

MOVING PLATFORM ROLL ANGLE DETERMINATION SYSTEM USING RF COMMUNICATIONS LINK

BACKGROUND OF THE INVENTION

Field of the Invention

This invention relates generally to techniques for determining the rotational orientation of a platform moving in space.

Description of the Related Art

It is often necessary to know the rotational orientation of a moving body or platform along with its spatial location. For example, it may be necessary to know the orientation of a moving projectile such as a missile in order to provide the missile with appropriate guidance data.

Several techniques are used to provide rotational orientation data of this sort. For example, it may be possible to determine the orientation of a moving platform by means of a radar system. However, such systems tend to be large, costly, consume large amounts of power and are easy to detect. Another approach is to affix accelerometers, gyroscopes, magnetometers, etc. to the platform; however, these devices tend to be expensive, bulky and complex.

It may also be possible to determine the rotational orientation of a moving platform by imaging it as it moves. However, this is likely to be difficult if conditions are turbulent or otherwise less than ideal and may be impossible if the projectile is small and rapidly spinning.

Another approach, described in co-pending U.S. patent application Ser. No. 13/531,918, employs an optical link between a transmitter and the moving platform to determine the rotational orientation of the platform. The transmitter preferably directs a linearly polarized laser beam towards the moving platform, and an ellipsometric detector capable of detecting the polarized beam when within the line-of-sight of the transmitter and measuring its polarization state is mounted to the moving platform. The polarization angle indicates the rotational orientation of the moving platform with respect to the predefined coordinate system. However, an optical link of this sort may suffer from problems due to certain environmental conditions. For example, an infrared laser does not efficiently penetrate fog, clouds, rain or dust.

SUMMARY OF THE INVENTION

A moving platform roll angle determination system is presented which addresses several of the problems noted above, providing a robust means of determining the rotational orientation of a moving platform through all weather conditions.

The present moving platform roll angle measurement system includes a transmitter which includes a transmitting antenna that generates at least one radio frequency (RF) signal, with the transmitted RF signals having known but different polarizations with respect to a predefined coordinate system. The system also includes at least one moving platform, each of which includes a receiving antenna capable of receiving the polarized RF signals. The transmitter and receiving antenna are arranged such that the roll angle of a moving platform can be determined based on the received RF signals.

In one embodiment, the transmitter generates two orthogonal linearly polarized RF signals, and the receiving antenna is a linearly polarized antenna which receives the two orthogonal linearly polarized RF signals. The roll angle is then determined based on the ratio of the power amplitudes of the received orthogonal linearly polarized RF signals.

In another embodiment, the transmitter generates one linearly polarized RF signal and the receiving antenna is a dual-polarized antenna which receives the linearly polarized RF signal and produces first and second output signals which represent the power amplitudes of the received linearly polarized RF signal at first and second orthogonal polarizations, respectively. The roll angle is then determined based on the ratio of the power amplitudes of the first and second output signals. The transmitter may be arranged to encode information into the RF signals by modulating one or both of the transmitted orthogonal linearly polarized RF signals; the information may include, for example, guidance commands.

These and other features, aspects, and advantages of the present invention will become better understood with reference to the following drawings, descriptions, and claims.

DETAILED DESCRIPTION OF THE INVENTION

Figure 1A:
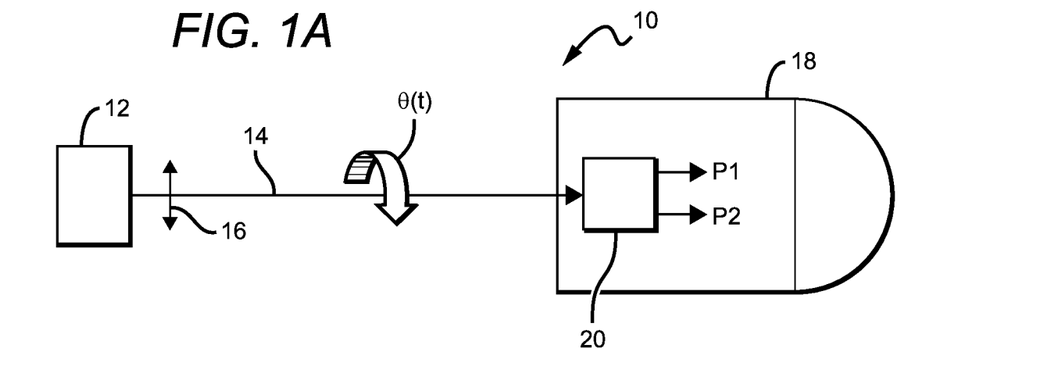
FIG. 1a is a block diagram of an orientation measurement system in accordance with the present invention.

The basic principles of a roll angle measurement system for a moving platform per the present invention are illustrated in FIG. 1a. The system 10 includes a transmitter 12 which includes a transmitting antenna which generates at least one radio frequency (RF) signal 14, with the transmitted RF signals having known but different polarizations 16 with respect to a predefined coordinate system. The moving platform, here a projectile 18, includes a receiving antenna 20 capable of receiving the at least one polarized RF signal; receiving antenna 20 would typically be coupled to a receiver (not shown). Transmitter 12 and receiving antenna 20 are arranged such that the roll angle θ of moving platform 18 can be determined based on the received RF signals.

This determination of roll angle may be accomplished in a number of ways. For example, transmitter 12 can be arranged to generate two orthogonal linearly polarized RF signals. Receiving antenna 20 is a linearly polarized antenna which receives the two orthogonal linearly polarized RF signals, with the roll angle θ determined based on the ratio of the power amplitudes (P1, P2) of the received orthogonal linearly polarized RF signals. This is illustrated in FIG. 1b.

Alternatively, transmitter 12 can be arranged to generate one linearly polarized RF signal. Receiving antenna 20 is a dual-polarized antenna which receives the linearly polarized RF signal and produces first and second output signals (P1, P2) which represent the power amplitudes of the received linearly polarized RF signal at first and second orthogonal polarizations, respectively. Roll angle θ can then be determined based on the ratio of the power amplitudes of P1 and P2.

By establishing a communications link between transmitter 12 and moving platform 18 using RF signals, problems that can adversely affect an optical communications link, such as signal attenuation due to environmental conditions like fog, clouds, rain or dust, are avoided. In this way, an all-weather, day-night communications link which enables roll angle to be determined can be established. The wavelengths of the RF signals are preferably long enough to avoid attenuation due to weather conditions and any disadvantageous atmospheric absorption lines. Frequencies in the range of 30-300 GHz are acceptable, with frequencies in the range of 100-250 GHz preferred. The transmitter 12 and receiver (not shown) can be implemented in numerous ways; a heterodyne-based architecture is preferred.

Figures 1B, 2A, 2B:
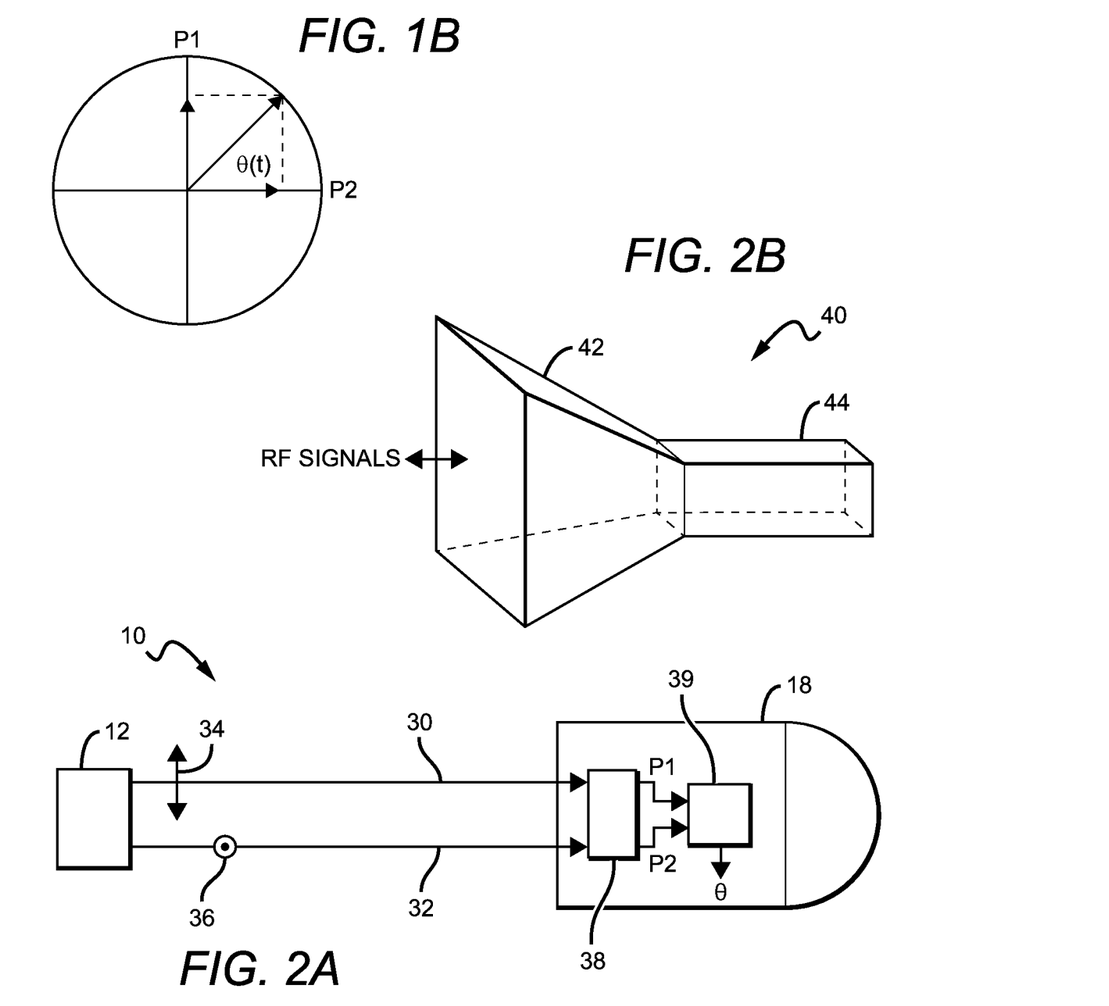
FIG. 1b is a diagram illustrating the components making up the rotational orientation value θ.
FIG. 2A is a block diagram of another embodiment of an orientation measurement system in accordance with the present invention.
FIG. 2B is a diagram of a horn antenna as might be used in an orientation measurement system in accordance with the present invention.
Figure 2C:
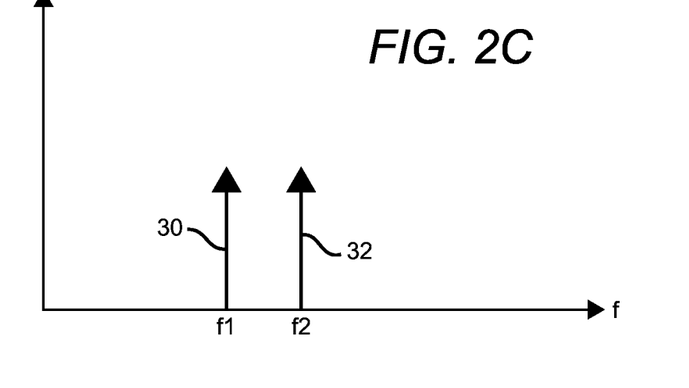
FIG. 2C is a graph which illustrates two orthogonal linearly polarized RF signals which have unequal frequencies.

A simplified diagram of one possible embodiment is shown in FIG. 2A. Here, transmitter 12 is preferably a dual-polarized transmitting antenna which generates two linearly polarized RF signals 30, 32, with the two RF signals having orthogonal polarizations such as polarizations 34, 36 shown. The moving platform's receiving antenna 38 is a linearly polarized antenna which receives orthogonal linearly polarized RF signals 30, 32; one possible embodiment (shown in FIG. 2B) is a horn antenna 40, typically rectangular in shape, which includes a flared horn 42 that receives the RF signals and a waveguide 44. The two orthogonal linearly polarized RF signals are preferably of equal power and contain identical data, but have frequencies which are preferably unequal. This is illustrated in FIG. 2C, with RF signal 30 having a y-axis polarization and a frequency f1, and RF signal 32 having a z-axis polarization and a frequency f2. Both the transmitting and receiving antennas have associated bandwidths (which may be unequal). The two frequencies should be selected so that both are within the bandwidths of the transmitting and receiving antennas.

The roll angle θ is then determined based on the trigonometric ratio of the power amplitudes P1, P2 of the orthogonal linearly polarized RF signals. Roll angle θ may be calculated with, for example, an on-board electronics module 39.

The present system can be arranged such that information can be encoded into the transmitted RF signals, by modulating one or both of transmitted signals. Such information might include guidance commands. Some moving platforms are capable of altering their direction when moving using flaps or other devices which can be actuated in response to guidance commands. The present system can be arranged such that the transmitter encodes such guidance commands into the RF signals, by modulating one or both of transmitted orthogonal linearly polarized RF signals 30, 32. The modulation can be any of a number of types, including amplitude modulation, frequency modulation, or phase modulation. The transmitter preferably modulates the power amplitudes of one or both of the transmitted orthogonal linearly polarized RF signals. The modulated signals are then received by the moving platform's receiving antenna and the moving platform is preferably arranged to decode the guidance commands by determining the sum of the power amplitudes of the received orthogonal linearly polarized RF signals.

Figure 3:
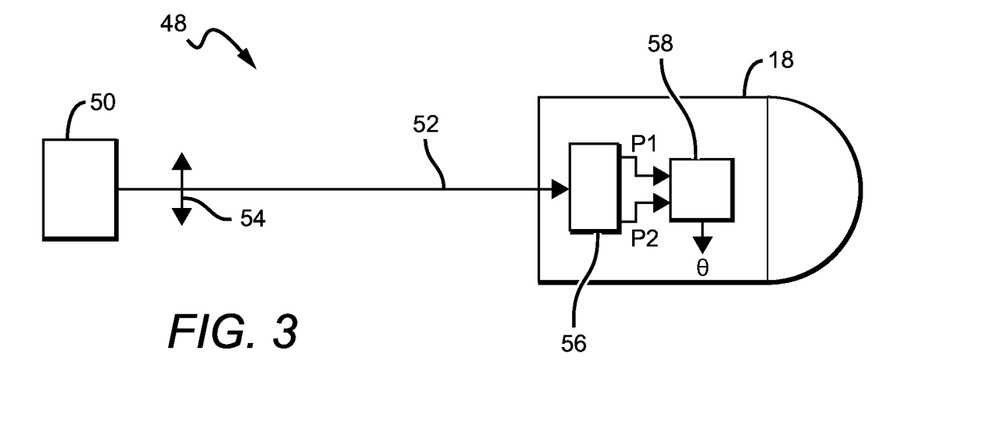
FIG. 3 is a block diagram of another embodiment of an orientation measurement system in accordance with the present invention.

Another possible embodiment 48 of the present system is shown in FIG. 3. Here, the transmitter 50 generates one RF signal 52 which is linearly polarized 54, and the receiving antenna 56 is a dual-polarized antenna which receives the linearly polarized RF signal and produces first and second output signals P1, P2 which represent the power amplitudes of the received linearly polarized RF signal at first and second orthogonal polarizations, respectively. The roll angle is determined based on the ratio of the power amplitudes of said first and second output signals. Roll angle θ may be calculated with, for example, an on-board electronics module 58. Dual-polarized receiving antenna 56 is suitably a patch antenna, which is typically inexpensive and mechanically robust; dual frequency designs with narrow frequency bands can also be easily realized with a patch antenna.

Dual-polarized receiving antenna 56 might also be a horn antenna having a square or round shape, coupled to a diplexer so that both polarizations can be output. Horn antennas typically provide a high degree of polarization discrimination, and can be machined into the moving platform.

The receiving antenna should be structurally strong, as it would typically be located at the back of the moving platform and thus subject to significant forces when the platform is launched. The moving platform is often spinning around a longitudinal axis as it moves; as such, the antenna is preferably rotationally symmetric around the longitudinal axis to avoid precession. The antennas are preferably inexpensive to manufacture in quantity, sized appropriately for the moving platform, and narrow band to avoid jamming.

As with the embodiment described above, the embodiment shown in FIG. 3 can be arranged such that transmitter 50 encodes information such as guidance commands into RF signal 52, by modulating the linearly polarized RF signals by a modulation means (amplitude modulation, frequency modulation, phase modulation, etc.). The transmitter 50 preferably modulates the power amplitude of transmitted linearly polarized RF signal 52. The modulated signal is then received by the moving platform's receiving antenna 56, with the moving platform preferably arranged to decode the guidance commands by determining the sum of power amplitudes P1 and P2.

One advantage with an RF signal-based system as described herein is that, due to the broad coverage range inherent in RF signals, one transmitter can be arranged to generate RF signals such that the roll angle of multiple moving platforms can be determined simultaneously. This might be accomplished by assigning unique frequencies to each platform and then transmitting linearly polarized signals as described above on each of the assigned frequencies.

The moving platform might be any device that is designed to be propelled through space. For example, the moving platform may be a steerable projectile such as a bullet.

One problem that might be encountered is that the P1 and P2 values will be the same whether the roll angle is X, or X+180°. This 'up/down' ambiguity is referred to as degeneracy in roll position. The present system may be arranged to overcome this degeneracy by forcing a flight path deviation. By tracking the platform's path after the deviation is effected, the up/down ambiguity can be resolved. Once the ambiguity has been resolved, the correct orientation can always be determined unambiguously by tracking the roll angle.

Figure 4:
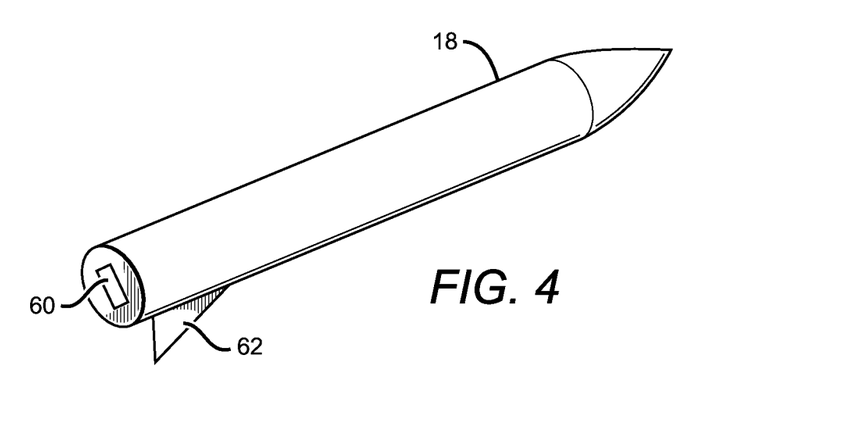
FIG. 4 is a block diagram of another embodiment of an orientation measurement system in accordance with the present invention.

To force a flight path deviation, the moving platform would typically be arranged to be able to vary its trajectory in response to guidance commands encoded into the transmitted RF signals. Such a platform would typically include a control device which affects the path of the platform when actuated, and which rotates with the platform. For example, as shown in FIG. 4, movable platform 18, with a receiving antenna 60 mounted at the rear, might include a flap 62 which, when actuated, causes the platform's trajectory to trend higher or lower depending on the flap's orientation at the time the flap was actuated. Thus, the transmitter is arranged to send guidance commands which actuate a control device such as flap 62, thereby affecting the platform's trajectory. The system is then arranged to detect the change in trajectory and to thereby determine the position of the control device at the time of the actuation. This process need only be performed once per flight, preferably near the start of each flight.

Figure 5:
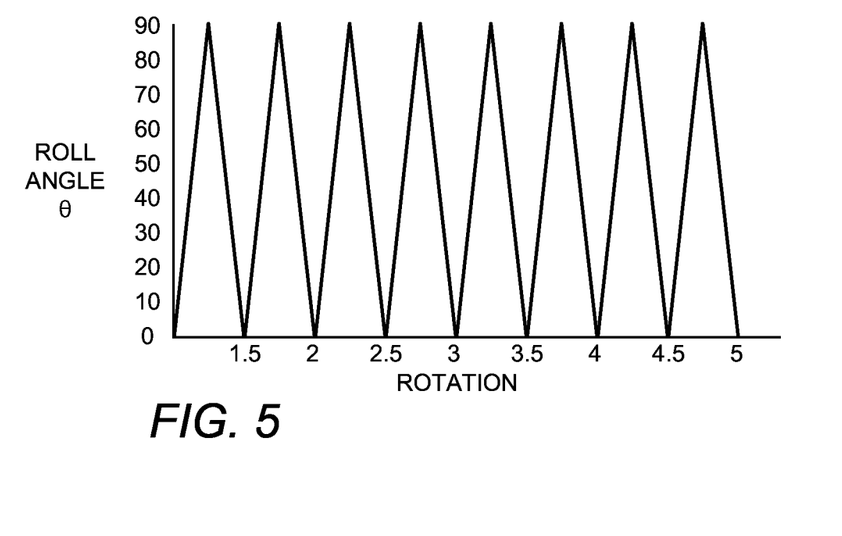
FIG. 5 is a plot illustrating how roll angle θ will vary over time as the moving platform rotates.

For example, for an embodiment such as that shown in FIG. 2A, where transmitter 12 generates two orthogonal linearly polarized RF signals 30,32 that are received by linearly polarized receiving antenna 38, the roll angle θ is given by $\tan^{-1}(P_v/P_h)$ where $P_v$ is the power amplitude of the received RF signal in the vertical direction and $P_h$ is the power amplitude of the received RF signal in the horizontal direction. As the moving platform rotates, the roll angle θ will vary over time as shown in FIG. 5. Once the up/down orientation has been determined as described above, the system can be arranged to track the up/down orientation by, for example, counting the changes in slope of angle θ.

Similarly, for an embodiment such as that shown in FIG. 3, where transmitter 50 generates one linearly polarized RF signal 52 that is received by dual-polarized receiving antenna 56, the roll angle θ is given by $\tan^{-1}(P_v/P_h)$ where $P_v$ is the power amplitude of the received RF signal in the vertical direction and $P_h$ is the power amplitude of the received RF signal in the horizontal direction. Once the up/down orientation has been determined as described above, the system can be arranged to track the up/down orientation by, for example, counting the changes in slope of angle θ. Alternatively, the up/down orientation might be tracked by counting the number of times that the roll angle crosses a predetermined value, such as 45°.

It may also be possible to track the up/down orientation by monitoring the summed powers (P1+P2), which will be modulated by the precession of the platform in response to the forced flight path deviation.

Up/down ambiguity might also be resolved by means of 'beamsteering', which requires that the receiving antenna be capable of having a directional reception pattern or 'beam'. One example of an antenna having this capability is a patch antenna. Here, degeneracy is overcome by breaking the symmetry of the beam about the receiving antenna's axis of rotation. For example, as shown in FIG. 5, transmitter 70 generates a beam which may have an associated directional pattern 72, and the receiving antenna on moving platform 74 has an associated directional reception pattern 76. To overcome degeneracy, pattern 76 is directed off-axis to the platform's axis of rotation 78.

If the system is arranged as shown in FIG. 2A, with a dual-polarized transmitting antenna generating two linearly polarized RF signals having different frequencies, the receiving antenna must be capable of receiving either two frequencies, two polarizations, or both. If the system is arranged as shown in FIG. 3, with a transmitting antenna generating one RF signal which is linearly polarized, the receiving antenna must be dual-polarized. For this latter case, the beam for each polarization must be off-axis (not rotationally symmetric). Up/down ambiguity resolution increases as the degree of rotational symmetry decreases; however, too little rotational symmetry can compromise the reception of guidance commands.

When so arranged, the receiving antenna beam for one or both frequencies/polarizations is pointed off-axis. The power modulation at the frequency of rotation is then monitored to determine 'up' versus 'down'. The received signal power will be a sine wave with a period equal to the rotation of the platform; however, the amplitude of the sine wave decreases as the platform travels away from the transmitter. This would result in an amplitude profile $\sin(x)/(R^2)$, where R is the distance between the platform and transmitter. This can be approximated by a damped sine wave.

Figure 6:
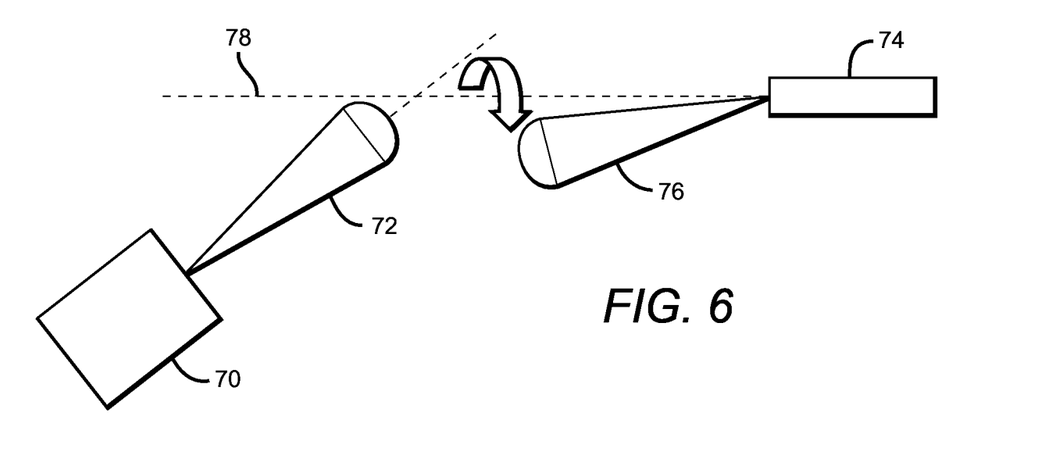
FIG. 6 is a diagram illustrating the use of beamsteering to resolve up/down ambiguity.
Figure 7:
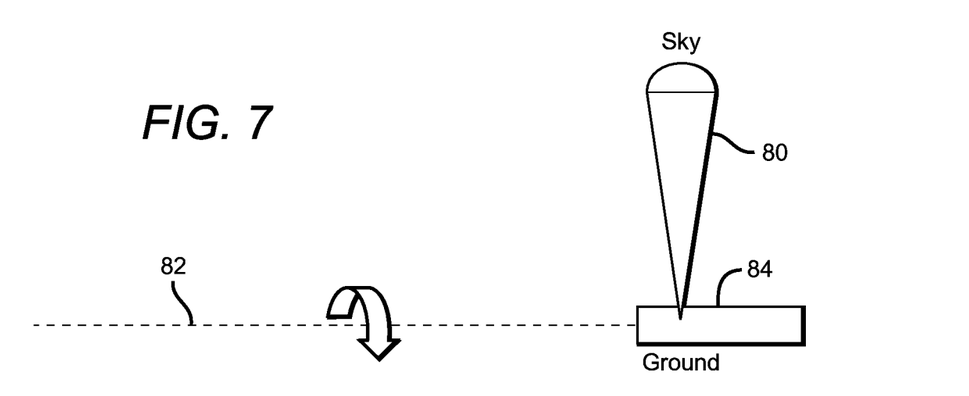
FIG. 7 is a diagram illustrating the use of radiometry to resolve up/down ambiguity.

Up/down ambiguity might also be resolved using radiometry. The black body radiation of the sky is shifted with respect to that of the ground; this shift can be detected as the moving platform rotates to determine 'up' versus 'down'. As illustrated in FIG. 6, this technique requires the addition of an additional antenna having a directional reception pattern 80 which extends normal to the axis of rotation 82 of the moving platform 84. The antenna, preferably broadband, is coupled to a power detector (radiometer) (not shown), which filters out any control signals that may be received and effectively detects the temperature difference between sky and ground; the power detector's output would typically be sinusoidal as the platform rotates, with an amplitude that varies with the detected temperature.

The embodiment shown in FIG. 2A is preferred, as it reduces the RF circuit component count needed on the moving platform; some of the RF circuit complexity is instead moved to the transmitter on the ground. Simplifying the moving platform's electronics in this way potentially offers significant cost savings.

The present system provides a number of benefits. Establishing an RF link between the transmitter and a moving platform as described herein provides a connection that is robust, even in an extremely turbulent environment. This is further aided by the use of polarization as a means to determine orientation, as polarization is less affected by atmospheric turbulence and scattering. The RF signals are subject to negligible refractive index gradients, and can be made to produce a uniform transmitted field intensity, while their source is difficult to detect. The distance between the transmitter and moving platform can be extended as needed, by simply increasing the power of the transmitted RF signals. Furthermore, due to the availability of high power sources, the transmitter can have a relatively low gain.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A moving platform orientation measurement system, comprising:
    a ground-based transmitter, comprising a dual-polarized transmitting antenna, said ground-based transmitter arranged to:
        generate two distinct, orthogonal linearly polarized radio frequency (RF) signals, receive said two distinct, orthogonal linearly polarized RF signals at said dual-polarized transmitting antenna; and to simultaneously radiate said two distinct, orthogonal linearly polarized radio frequency (RF) signals from said dual-polarized transmitting antenna, said transmitted RF signals having known but different polarizations with respect to a predefined coordinate system; and at least one moving platform, each moving platform comprising a linearly polarized receiving antenna capable of receiving said two orthogonal linearly polarized RF signals, said transmitter and receiving antenna arranged such that the roll angle of said moving platform can be determined based on the ratio of the power amplitudes of said two orthogonal linearly polarized RF signals, said roll angle $\theta$ given by $\tan^{-1}(P_v/P_h)$ where $P_v$ is the power amplitude of said received RF signal in the vertical direction and $P_h$ is the power amplitude of said received RF signal in the horizontal direction;

wherein said ground-based transmitter is arranged to encode guidance commands into said two distinct, orthogonal linearly polarized RF signals by modulating at least one of said transmitted RF signals and said moving platform is arranged to detect and decode said signals and thereby detect said guidance commands.

2. The system of claim 1, wherein each of said at least one RF signal has an associated frequency in the range of 30-300 GHz.

3. The system of claim 2, wherein each of said at least one RF signal has an associated frequency in the range of 100-250 GHz.

4. The system of claim 1, further comprising a diplexer coupled to the output of said receiving antenna and arranged to output first and second signals that vary with the amplitudes of said received orthogonal linearly polarized RF signals.

5. The system of claim 1, wherein said transmitting and receiving antennas have associated bandwidths, said transmitter arranged such that said two orthogonal linearly polarized RF signals have respective frequencies which are unequal but within the bandwidths of both said transmitting and receiving antennas.

6. The system of claim 1, wherein said transmitter is arranged to encode information into said RF signals by modulating one or both of said transmitted RF signals.

7. The system of claim 6, wherein said modulation is amplitude modulation, frequency modulation, or phase modulation.

8. The system of claim 1, wherein said transmitter is arranged to encode guidance commands into said RF signals by modulating the power amplitudes of one or both of said transmitted orthogonal linearly polarized RF signals, and said receiving antenna on said moving platform is arranged to receive said guidance commands by determining the sum of the power amplitudes of said received orthogonal linearly polarized RF signals.

9. The system of claim 1, wherein said receiving antenna on the moving platform receives said orthogonal linearly polarized RF signals and produces first and second output signals which represent the power amplitudes of said received orthogonal linearly polarized RF signals at first and second orthogonal linear polarizations, respectively, said roll angle determined based on the ratio of the power amplitudes of said first and second output signals.

10. The system of claim 9, wherein said receiving antenna is a patch antenna.

11. The system of claim 10, wherein said patch antenna is a dual-frequency antenna.

12. The system of claim 9, wherein said transmitter is arranged to encode information into said RF signals by modulating said transmitted orthogonal linearly polarized RF signals.

13. The system of claim 12, wherein said modulation is amplitude modulation, frequency modulation, or phase modulation.

14. The system of claim 9, wherein said transmitter is arranged to encode guidance commands into said RF signals by modulating said orthogonal transmitted linearly polarized RF signals.

15. The system of claim 14, wherein said transmitter is arranged to encode guidance commands into said RF signals by modulating the power amplitude of said transmitted orthogonal linearly polarized RF signals, and said receiving antenna on said moving platform is arranged to receive said guidance commands by determining the sum of the power amplitudes of said first and second output signals.

16. The system of claim 1, wherein said transmitter is arranged to generate RF signals such that the roll angle of multiple moving platforms can be determined.

17. The system of claim 1, wherein each of said at least one moving platform is a steerable bullet.

18. The system of claim 1, wherein said moving platform is arranged to receive guidance commands via said received RF signals and to vary its trajectory in response to said guidance commands.

19. The system of claim 18, wherein said moving platform includes a control device which affects the path of said platform when actuated and which rotates with said platform, said transmitter arranged to send guidance commands which actuate said control device such that said platform's trajectory is affected, said system arranged to detect how said platform's trajectory is affected by said actuation and to thereby determine the position of said control device at the time of said actuation.

20. The system of claim 1, wherein said moving platform has an associated longitudinal axis around which it rotates, said receiving antenna arranged to be rotationally symmetric around said longitudinal axis.

21. The system of claim 1, wherein said moving platform has an associated longitudinal axis around which it rotates and said receiving antenna has a directional reception pattern, said receiving antenna arranged such that said directional reception pattern is pointed off-axis with respect to said longitudinal axis.

22. The system of claim 21, wherein said receiving antenna is a dual-polarized antenna, a dual-frequency antenna, or both, with the directional reception pattern for both polarizations and/or frequencies being pointed off-axis.

23. The system of claim 21, further comprising a means of monitoring the power modulation in the output of said receiving antenna at the frequency of rotation.

24. The system of claim 1, wherein said receiving antenna is coupled to a receiver.

25. The system of claim 24, wherein said transmitter and receiver have a heterodyne-based architecture.

26. The system of claim 1, wherein said two orthogonal linearly polarized radio frequency (RF) signals are of equal power and contain identical data.

27. A moving platform orientation measurement system, comprising:

a transmitter which includes a transmitting antenna and is arranged to transmit at least one radio frequency (RF) signal, each transmitted RF signal having a known polarization with respect to a predefined coordinate system and, when there are more than one transmitted RF signal, said RF signals having known but different polarizations with respect to said predefined coordinate system; and at least one moving platform, each moving platform comprising a receiving antenna capable of receiving said at least one polarized RF signal, said transmitter and receiving antenna arranged such that the roll angle of said moving platform can be determined based on said transmitted and received RF signal;

wherein said moving platform is arranged to receive guidance commands via said received RF signals and to vary its trajectory in response to said guidance commands;

wherein said moving platform includes a control device which affects the path of said platform when actuated and which rotates with said platform, said transmitter arranged to send guidance commands which actuate said control device such that said platform's trajectory is affected, said system arranged to detect how said platform's trajectory is affected by said actuation and to thereby determine the position of said control device at the time of said actuation; and wherein said transmitter generates two orthogonal linearly polarized RF signals and said antenna is a linearly polarized antenna which receives said two orthogonal linearly polarized RF signals, said roll angle θ given by $\tan^{-1}(P_v/P_h)$ where $P_v$ is the power amplitude of said received RF signal in the vertical direction and $P_h$ is the power amplitude of said received RF signal in the horizontal direction, said system arranged to track the orientation of said control device by counting the changes in slope of said angle θ after the position of said control device at the time of said actuation has been determined.

28. A moving platform orientation measurement system, comprising:

a transmitter which includes a transmitting antenna and is arranged to transmit at least one radio frequency (RF) signal, each transmitted RF signal having a known polarization with respect to a predefined coordinate system and, when there are more than one transmitted RF signal, said RF signals having known but different polarization with respect to said predefined coordinate system; and at least one moving platform, each moving platform comprising a receiving antenna capable of receiving said at least one polarized RF signal, said transmitter and receiving antenna arranged such that the roll angle of said moving platform can be determined based on said transmitted and received RF signal;

wherein said moving platform is arranged to receive guidance commands via said received RF signals and to vary its trajectory in response to said guidance commands;

wherein said moving platform includes a control device which affects the path of said platform when actuated and which rotates with said platform, said transmitter arranged to send guidance commands which actuate said control device such that said platform's trajectory is affected, said system arranged to detect how said platform's trajectory is affected by said actuation and to thereby determine the position of said control device at the time of said actuation; and wherein said transmitter generates one linearly polarized RF signal and said antenna is a dual-polarized antenna which receives said linearly polarized RF signal and produces first and second output signals $P_1$ and $P_2$, respectively, which represent the power amplitudes of said received linearly polarized RF signal at first and second orthogonal polarizations, respectively, said roll angle θ given by $\tan^{-1}(P_1/P_2)$, said system arranged to track the orientation of said control device by counting the changes in slope of said angle θ after the position of said control device at the time of said actuation has been determined.

29. A moving platform orientation measurement system, comprising:

a transmitter which includes a transmitting antenna and is arranged to transmit at least one radio frequency (RF) signal, each transmitted RF signal having a known polarization with respect to a predefined coordinate system and, when there are more than one transmitted RF signal, said RF signals having known but different polarizations with respect to said predefined coordinate system; and at least one moving platform, each moving platform comprising a receiving antenna capable of receiving said at least one polarized RF signal, said transmitter and receiving antenna arranged such that the roll angle of said moving platform can be determined based on said transmitted and received RF signal;

wherein said moving platform has an associated longitudinal axis around which it rotates, further comprising:
an additional antenna oriented normal to said longitudinal axis; and
a power detector coupled to the output of said additional antenna and arranged to detect the difference in temperature between when said additional antenna is pointing skyward and when said additional antenna is pointing toward the ground.

30. A method of determining the roll angle of a moving platform, comprising:

receiving, at a dual-polarized transmitting antenna, two distinct orthogonal linearly polarized RF signals;

simultaneously transmitting, from the ground, said two distinct, orthogonal linearly polarized RF signals using said dual-polarized transmitting antenna;

polarizing each of said transmitted RF signals with respective known polarizations with respect to a predefined coordinate system;

encoding guidance commands into said two distinct, orthogonal linearly polarized RF signals by modulating one or both of said orthogonal linearly polarized RF signals transmitted from the ground;

receiving said transmitted orthogonal linearly polarized RF signals at said platform; and determining the roll angle of said moving platform with respect to said predefined coordinate system based on the ratio of the power amplitudes of said received orthogonal linearly polarized RF signals, said roll angle θ given by $\tan^{-1}(P_v/P_h)$ where $P_v$ is the power amplitude of said received RF signal in the vertical direction and $P_h$ is the power amplitude of said received RF signal in the horizontal direction.

31. The method of claim 30, further comprising encoding information into said RF signals by modulating one or both of said transmitted orthogonal linearly polarized RF signals.

32. The method of claim 30, wherein said encoding of said guidance commands into said RF signals comprises modulating the power amplitudes of one or both of said transmitted orthogonal linearly polarized RF signals, further comprising receiving said guidance commands by determining the sum of the power amplitudes of said received orthogonal linearly polarized RF signals.

33. The method of claim 30, wherein said receiving comprises receiving said orthogonal linearly polarized RF signals, further comprising producing first and second output signals which represent the power amplitudes of said received orthogonal linearly polarized RF signals, said determining said roll angle based on the ratio of the power amplitudes of said first and second output signals.

34. The method of claim 30, wherein said two orthogonal linearly polarized radio frequency (RF) signals are of equal power and contain identical data.

\* \* \* \* \*